Feb. 18, 1941. N. M. BARKER 2,232,307
DIVIDER FOR LUBRICATION SYSTEMS
Filed Aug. 25, 1939 4 Sheets-Sheet 1

Feb. 18, 1941.　　　N. M. BARKER　　　2,232,307
DIVIDER FOR LUBRICATION SYSTEMS
Filed Aug. 25, 1939　　4 Sheets-Sheet 2

Inventor
Norman M. Barker

Feb. 18, 1941.   N. M. BARKER   2,232,307
DIVIDER FOR LUBRICATION SYSTEMS
Filed Aug. 25, 1939   4 Sheets-Sheet 4

Inventor
Norman M. Barker
By N. N. Finckel Jr.
Attorney

Patented Feb. 18, 1941

2,232,307

UNITED STATES PATENT OFFICE 2,232,307

DIVIDER FOR LUBRICATION SYSTEMS

Norman M. Barker, Wadsworth, Ohio, assignor to The Ohio Injector Company of Illinois, Chicago, Ill., a corporation of Illinois Application August 25, 1939, Serial No. 291,961

18 Claims. (Cl. 184—7)

This invention relates particularly to dividers for lubrication systems, but it will be apparent from the following description that the device is capable of feeding any pressure fluid. That is to say, it has reference to a device adapted to receive lubricant or other fluid from a pressure source and to automatically divide and distribute such lubricant or other fluid, in measured quantities, to a plurality of outlets from which the lubricant or other fluid is led, by suitable piping or tubing, to points of application or use.

One object of the invention is to provide a device of this character which is dependent for its efficient operation solely upon the pressure of the lubricant or other fluid supplied to it.

Another object of the invention is to furnish a divider having such structural and operative characteristics that, should it cease to function, neither the device itself nor parts connected with it will be injured by the lubricant or other fluid under pressure.

A further object of the invention is to furnish a divider in which, should one or more of the outlets or the feed device connected therewith become obstructed, the divider will cease operation and the attendant will be apprised of a failure of feed from it.

Still another object of the invention is to furnish a divider in which provision is made for distributing the measured quantities of lubricant or other fluid supplied through two main outlets to an appropriate plurality of auxiliary outlets each of which receives a properly proportioned quanity.

Another object is to furnish a divider susceptible, without modification of its structural and functional characteristics, of including means for supplying to its outlets a pressure fluid, such as steam or compressed air, in which the lubricant or other fluid delivered to such outlets may be entrained and thus carried to points of application.

Another object of the invention is to furnish a divider in which the lubricant or other fluid may be delivered in predetermined quantities at each of the various outlets; these predetermined quantities remaining the same even though the pressures at the outlets vary to a considerable degree.

The invention comprises a divider for lubrication systems or other systems contemplating the feed and distribution of a fluid under either constant or pulsating pressure, including a body preferably comprising, for ease of assembly of internal parts, two mating members separably assembled and provided with bores preferably in parallel alignment and adapted to receive for reciprocative sliding movement a plunger and a valve member respectively, the bore in which the plunger slides providing a chamber at each end of the plunger, and the bore of the valve member providing a chamber at each end of the valve member. The body is ported to afford communication between adjacent end chambers of the two bores, and a single inlet for lubricant or other fluid under pressure is furnished to supply pressure lubricant or other fluid to the chambers at both ends of the valve member. Main outlet ports, preferably two in number, also communicate with the bore of the valve member. The valve member and plunger are operatively interconnected so that movement of the plunger in one direction under the influence of pressure lubricant or other fluid upon one of its ends will cause delivery of lubricant or other fluid from the chamber at its opposite end, and upon the plunger nearing the end of its travel in one direction it will impart movement in the opposite direction to the valve member, thus permitting the pressure lubricant or other fluid to act against the opposite end of the plunger and thereby reversing the direction of movement of the plunger so that lubricant or other fluid will be delivered at the end of the plunger opposite to that against which the pressure lubricant or other pressure fluid is acting. And the invention comprises, further, various details of construction whereby the objects above referred to are attained, including a distributor valve preferably actuated in consonance with the reciprocation of the plunger to distribute lubricant or other fluid alternately discharged at the two main outlets to appropriate pluralities of auxiliary outlets, and a manifold for supplying pressure fluid at the outlets for the purpose referred to, all as will be explained hereinafter more fully and finally claimed.

Although, as hereinbefore stated, the device of the invention is susceptible of feeding a variety of pressure fluids, the following description will deal mainly with its function as a divider for lubricant for which it is primarily adapted.

In the accompanying drawings illustrating the invention, in the several figures of which like parts are similarly designated.

Referring to the form of the invention illustrated in Figs. 1 to 5 inclusive and 10, it will be seen that the divider includes a body of appropriate form and size to accommodate the working parts and including two members 1 and 2 separably secured together in fluid tight relation upon the line of separation 3 by a plurality of cap screws or the like 4, a suitable gasket being interposed between the parts 1 and 2 if desired, although such gasket is not illustrated in the drawings.

The body member 2 is provided with a bore 5 the ends of which are counterbored and closed by means of screw-threaded plugs 6 carrying stops 7 which serve to limit the reciprocative stroke of the valve member 8, hereinafter more fully described.

The body member 1 is provided with a bore 9 counterbored at its ends and closed by screw-threaded plugs 10 forming chambers at the ends of the bore. Within the bore 9 is arranged a reciprocative plunger 11 which functions, upon admission of pressure fluid to the chamber at one end of the bore 9, to move toward the chamber at the other end of the bore and displace therefrom lubricant previously admitted to such last-mentioned chamber, as will be explained in detail hereinafter.

The bores 5 and 9 are interrupted substantially centrally of the body member to provide a pocket 12 in which oscillates a link comprising two telescoping members 13 and 14 enclosing a resilient compression member or spring 15, the telescoping members 13 and 14 being pivotally connected at 16 and 17 with the plunger 11 and valve member 8 respectively.

Arranged in suitable recesses 18 which may be provided, as shown, in the body member 1 are abutment members, preferably in the form of disks having flattened chamfered abutment faces 19 with which the link engages to transmit the reciprocative movement of the plunger 11 to the valve member 8. It will be apparent that by enclosing the resilient member or spring 15 within the telescoping parts 13 and 14 of the link it is protected from injury, contact of the link with the abutment members being made by the sleeve-like member 13.

A single inlet 20 (Fig. 3) is branched, as indicated at 21, 21, to conduct pressure lubricant to the chambers of the bore 5 at opposite ends of the valve member 8, and the body is ported as indicated at 22, 23 so that, during certain positions of the valve member, hereinafter explained, pressure lubricant may flow from the chambers of bore 5 to adjacent end chambers of bore 9.

Two main lubricant outlets 25, including suitable check valves are provided in such relation to the ports 22 as to be controlled by the valve member 8. The check valves in the form shown include balls 26 supported upon followers 27 upon which they may rotate to present new seating surfaces, and these followers 27 are provided with stems 28 (see Fig. 6) axially slidable in the bores 29 of screw-threaded guide plugs 30, the followers being backed up by springs 31.

Figure 4:
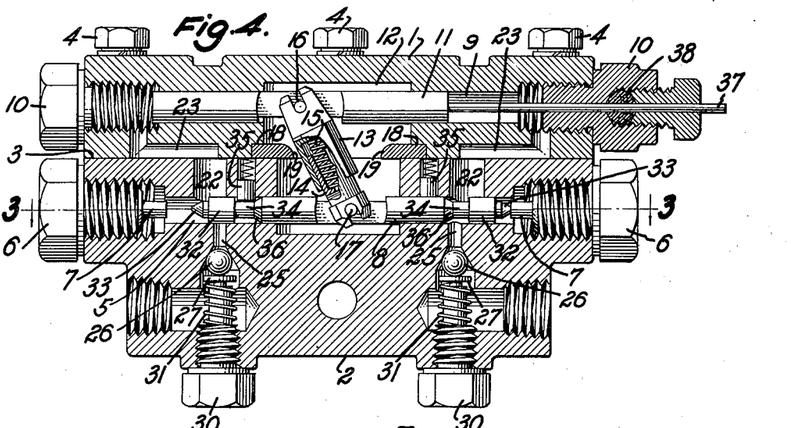
Fig. 4 is a vertical sectional elevation taken on the line 4—4 of Fig. 2, with parts omitted.

The valve member 8 is provided at opposite ends with heads 32 terminating in stop extensions 33 adapted to abut against the stops 7 to limit the extent of reciprocation of the valve member. It will be noted that the heads 32 function as plug valves to open and close communication between the end chambers of the bore 5 and the ports 22, and as slide valves to open and close the outlets 25. Back of the heads 32 the valve member 8 is reduced to provide recessed portions 34 which form suitable means for connecting ports 22 with ports 25 when valve member 8 is in appropriate position. Referring to Fig. 4, plunger 11 is being forced to the right hand end of bore 9 and plunger 11 is displacing lubricant at right hand end by forcing it through port 23, port 22, around the valve member at 34 and out through port 25. The inner walls of the valve member at its recesses 34 are chamfered at 36, and the recesses 34 function as a means for engagement with lock pins 35 which prevent premature reversal of movement of valve member 8 and also prevent the valve member from creeping in the same direction as the plunger 11 at such times as pressure lubricant is not being supplied through inlet 20. The latch pins 35 are spring pressed into the recesses 34 and prevent complete reversal of valve member 8 until the sleeve-like member 13 of the inter-connecting link member has been forced by movement of the plunger into contact with an abutment 19, and using such abutment 19 as a fulcrum has moved the valve member in the opposite direction to the direction of movement of the plunger a distance sufficient to force the lock pin 35 up the chamfered edge of the recess 34 and thus permit the spring 15 to move the valve member until its extension 33 contacts the adjacent stop 7, thus completing reversal of the valve member. The purpose of the latching mechanism 35, 36 is, as stated, to positively prevent creeping of the valve member 8 in the same direction as the plunger 11, and also to definitely control the point of reversal of valve member 8.

Preferably the plunger 11 is provided at one end with a rod 37 which extends through a stuffing box 38 in the plug 10, and this rod may be of any appropriate cross section or diameter desired, and may carry graduations to indicate the cubical displacement of the plunger 11 and rod 37 at its respective end. Obviously, the larger the diameter or cross section of this rod 37 the smaller will be the displacement of the plunger and rod for a given travel. As the travel is predetermined it is obvious that the volume displaced at one end of the plunger 11 may be equal to or greater or less than that displaced at the opposite end. Rods may be applied at each end or either end to accomplish any desired proportioning of the total input, or to vary the volume per stroke. Moreover, the projecting end of the rod 37 will provide a visual indicator to apprise an observer of the functioning or non-functioning of the device for, obviously, if it is observed that the rod 37 is not travelling in and out, it will be apparent that the plunger, and hence the divider, is not operating.

Figure 5:
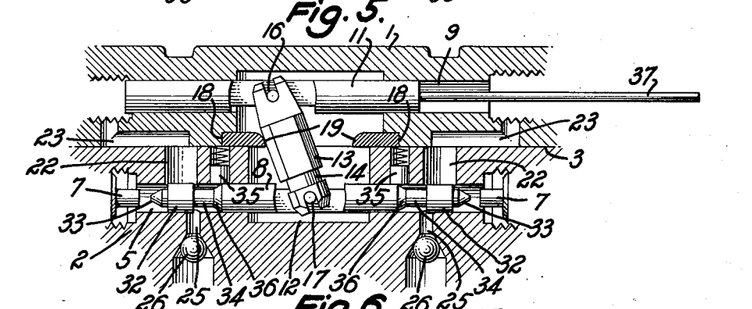
Fig. 5 is a fragmentary sectional elevation similar to Fig. 4 but illustrating the valve member in a median position.

Referring to Fig. 5 it will be seen that the valve member 8 is shown in mid-position, and that both locking pins 35 are out of their respective recesses 34. The valve member can remain in this position only in the event that the spring-actuated inter-connecting member, comprising the parts 13, 14 and 15, does not exert sufficient force to move the valve member in its bore 5 until one of its extensions 33 contacts its respective stop 7. However, this position might be assumed by the valve if it did not slide freely in its bore for any reason. To provide for such a condition, it will be noted that the distance between the outer edges of the plug valves 32 is less than the distance between the outer edges of ports 22, also that the distance between the inner edges of the plug valves 32 is greater than the distance between the inner edges of ports 22 and thus the chambers at each end of the valve member are in direct communication through ports 22 with outlet ports 25. Hence, as the chambers at both ends of the valve are in communication through branch ports 21, with inlet 20, it is obvious that free passage from inlet 20 to both outlet ports 25 is established, and therefore no harmful pressure can be built up in the divider or its source of supply.

Figure 6:
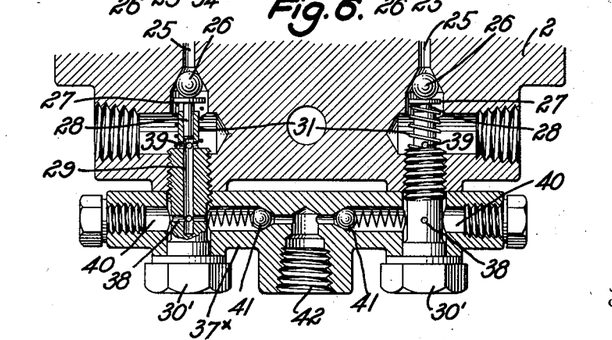
Fig. 6 is a fragmentary sectional elevation similar to Fig. 4, but illustrating the application to the divider of the manifold for supplying pressure fluid.

Referring to Fig. 6, it will be seen that the divider of the invention is well adapted for combination with auxiliary means for supplying a pressure fluid, such as steam or compressed air, at the lubricant outlets for the purpose of entraining or spraying the discharged lubricant in its delivery to points of application, as is sometimes found desirable.

This adjunct may comprise a manifold 37ˣ rigidly attached to the body of the divider by elongated screw-threaded guide plugs 30' the bores 29 of which are cross bored as indicated at 38 and 39 to afford communication of the pressure fluid supplying bores 40 with the lubricant outlets, the bores 40 having controlled communication by way of check valves 41 with the pressure fluid inlet 42.

Figure 1:
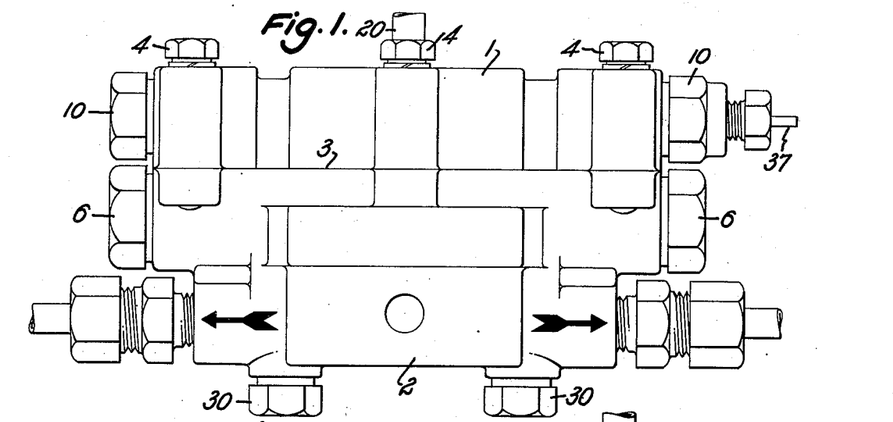
Figure 1 is a front elevation of a divider embodying the features of the invention.
Figures 2, 3:
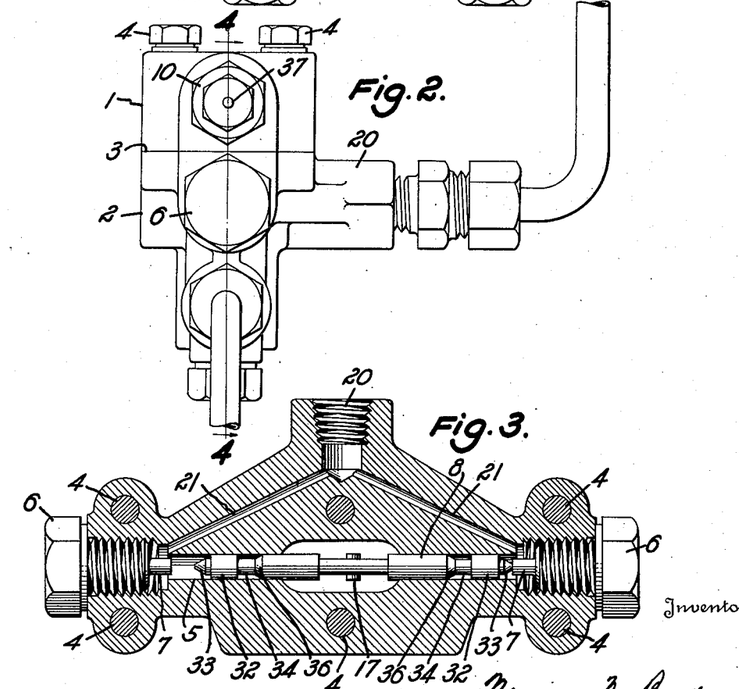
Fig. 2 is an end view thereof looking at the right hand end of Fig. 1.
Fig. 3 is a horizontal sectional elevation taken on the line 3—3 of Fig. 4.
Figure 10:
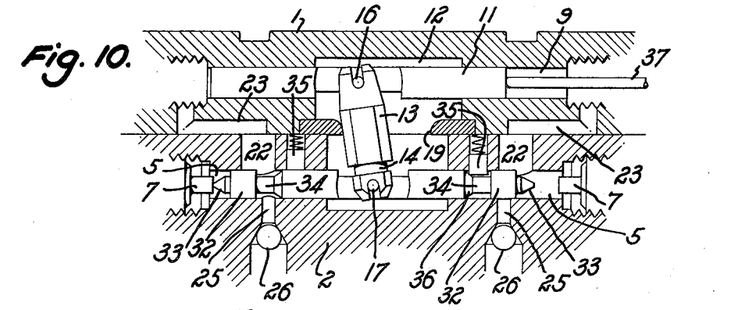
Fig. 10 is a fragmentary sectional view similar to Fig. 4, but showing the parts in a different relative position.

The operation of the divider as thus far described is as follows:

Referring to Figs. 3, 4 and 10 and assuming that the parts are in the position illustrated in Fig. 10, pressure lubricant admitted at the inlet 20 and filling the branches 21 will follow the left hand branch to the chamber at the left hand end of bore 5 where outlet is stopped by the plug valve 32, and the pressure lubricant will also follow the right hand branch 21 to the chamber at the right hand end of bore 5, and will pass therefrom through ports 22 and 23 to the chamber at the right hand end of bore 9 and act upon the plunger 11 forcing it to the left. This movement of the plunger 11 will displace the lubricant previously admitted to the chamber at the left hand end of bore 9, forcing it through ports 23 and 22, around the reduced portion 34 of the valve member 8 and through the outlet 25 at the left end, there unseating the check valve 26 and passing thence through a suitable pipe or tube to a point of application. As illustrated in Fig. 10, the plunger 11 has moved nearly to its extreme position in a left hand direction, the valve member 8 having been in the position shown, and stop extension 33 of the valve member having been in contact with stop 7 during this leftward movement. It will be obvious that during the leftward movement of the plunger 11, the member 14 of the interconnecting link member has partially rotated around the trunnion 16 of the plunger 11, and the member 18 of the link has partially rotated around the trunnion 17 of the valve member and has thus compressed the spring 15. It will be noted that in the position shown in Fig. 10 the link has assumed an angle tending to exert a force in a right hand direction upon the valve member 8, that the lock pin 35 at the right hand end is spring pressed into the cooperating reduced portion 34 of the valve member and thus offers resistance to movement due to the force exerted by the spring 15, and that the sleeve-like part 13 of the link is in contact with the left-hand abutment 19. As the plunger 11 continues its movement to the left, the abutment 19 functions as a fulcrum upon which the link acts as a lever to force the valve member in a right-hand direction, thus forcing the lock pin 35 out of engagement with the reduced portion 34 of the valve member. The link due to this further movement, will then have assumed a position of sufficient angularity to permit the spring 15 to force the valve member almost instantaneously to its extreme right-hand position with the stop extension 33 in contact with stop 7 at right-hand end. Fig. 4 illustrates the positions the parts have now assumed, and pressure lubricant will act upon the left-hand end of plunger 11 through left-hand ports 22 and 23 thus forcing the plunger 11 in a right-hand direction, and the operations just described will be repeated in reverse.

The travel or stroke of the plunger 11 being a fixed distance, it is obvious that the quantity of pressure lubricant delivered at each stroke may be varied by changing the area of the plunger either by changing its diameter or by changing the displacement by the use of various sized rods 37 at either one or both ends of the plunger 11. The volume of lubricant delivered per stroke of plunger 11 may thus be varied at will at either or both ends.

Obviously this reciprocation of the plunger 11 and valve member 8 will continue as long as pressure lubricant is supplied at the inlet 20, assuming that the parts are enabled to function freely. If either of the feed lines extending from the divider should cease to function this cessation will be apparent to an observer because reciprocation of the rod 37 will stop. Thus, as distinguished from other dividers, the divider of the invention will at once apprise an attendant that there is a stoppage somewhere in the lubricating system and that lubricant is not feeding to the points of application, thus precluding the likelihood of continued operation of a machine without adequate lubrication of its moving parts supplied with lubricant by way of the divider.

The divider of the invention, as illustrated in Figs. 1 to 5 inclusive and 10, is susceptible of an arrangement in multiple whereby many more lubricant outlets than the two main outlets of the individual divider may be provided in an installation, thus making possible division of pressure lubricant from a single source into a great many deliveries. This may be accomplished by attaching the inlets of individual dividers with the outlets of other individual dividers and the inlets of still other dividers with the outlets of the added dividers, and so on, but it will be apparent that the delivery volume from the added dividers will be proportionately reduced in accordance with the number of divisions made as determined by the delivery capacity of the plunger 11 at the ends of the bore 9 of the first and intermediate dividers.

Figure 7:
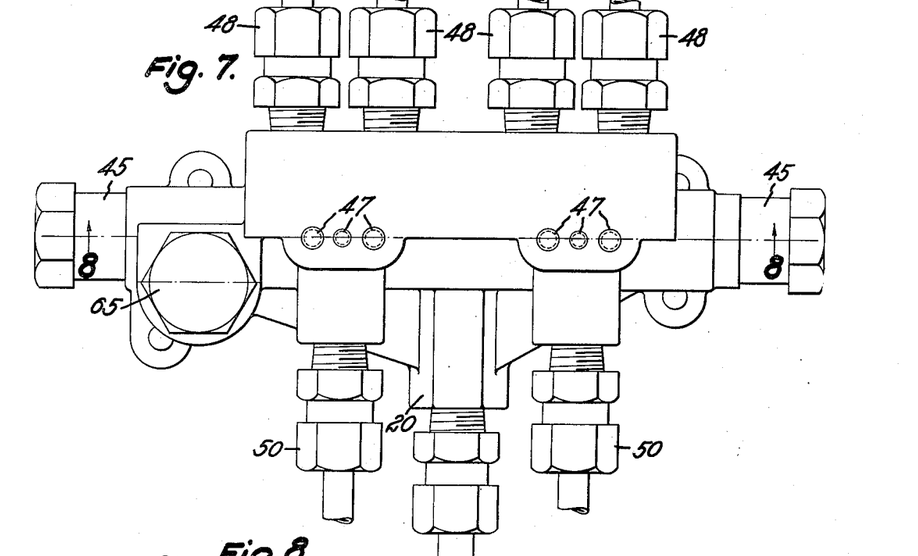
Fig. 7 is a top plan view of a modified form of the divider in which a distributor valve is used for distributing the discharged lubricant from the two main outlets to pluralities of auxiliary outlets.
Figure 8:
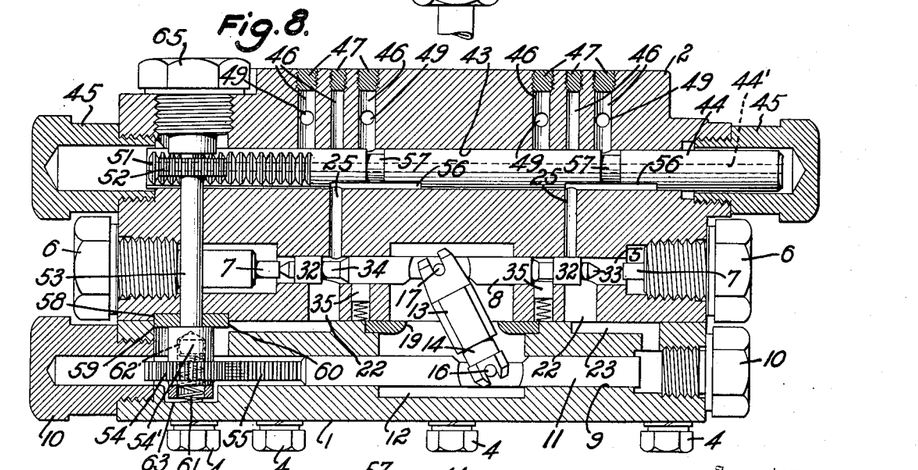
Fig. 8 is a vertical sectional elevation taken substantially on the line 8—8 of Fig. 7.
Figure 9:
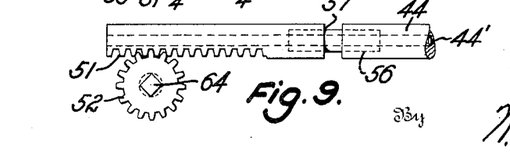
Fig. 9 is a detail illustrating the rack and pinion mechanism for actuating the distributor valve of Fig. 8.

In Figs. 7, 8 and 9 modification of the divider of the invention is illustrated whereby a plurality of outlets, six as shown, may be provided in a single divider and furnished with lubricant from the two main outlets 25 of the divider.

In this form of the invention, the primary operative parts of the divider are the same as hereinbefore described, and have been given similar reference characters. However, the member 2 of the body is preferably enlarged to accommodate a bore 43 in which is mounted a reciprocative distributing valve 44, housed within the bore by screw-threaded cap plugs 45. With this bore 43 the two outlets 25 communicate, and the body member is ported and plugged as indicated at 46, 47 to provide three outlets adjacent to each of the outlets 25, the connections 48 to four of such outlets being arranged upon one side of the body and communicating with the ports 46 by bores 49, and the connections 50 for the other two outlets being arranged at the opposite side of the body and communicating with their respective ports 46 by bores similar to the bores 49, but not shown. This arrangement provides for easy handling of the connections without crowding.

The distributor valve 44 is provided at one end with rack teeth 51 engaged by a pinion 52 mounted at one extremity of a shaft 53 which carries at its other end a pinion 54 meshing with a rack extension 55 of the plunger 11. Hence, when the plunger 11 reciprocates, the distributor valve will reciprocate in consonance with it, and inasmuch as the distributor valve is recessed as shown at 56 and 57 for the passage of lubricant around it from the outlets 25, the recesses 57 will be moved with respect to the adjacent ends of the ports 46 and will successively supply lubricant to them as the distributor valve reciprocates. The axial length of the recesses 57 is slightly greater than the width of the material of the body separating the ports 46, and thus one port 46 opens before its adjacent port 46 has closed, thereby preventing a momentary stoppage of flow of pressure lubricant through the ports. It will be noted that the central or middle port 46 of each group of three is made of less diameter than the adjacent ports. This is required in the construction illustrated to provide equal volume of delivery at each of the ports 46, by insuring that recess 57 will be in communication with each of the ports 46 a like distance as the distributing valve moves axially across the ports 46. An axial opening 44' extends through the distributor valve to prevent any dash-pot effect in the bore 43.

Inasmuch as each main outlet 25 delivers lubricant to three final outlets 49, the lubricant from outlets 25 being equally divided between outlets 49 by means of the distributing valve 44 actuated by the plunger 11, it is obvious that as many final outlets may be supplied as may be desired, by changing the location of ports 46 and by appropriate modification of the distributing valve 44. It will also be apparent that the number of final outlets 49 at one end, supplied by the main outlets 25, may be equal or unequal to the number of final outlets supplied at the other end.

Figure 11:
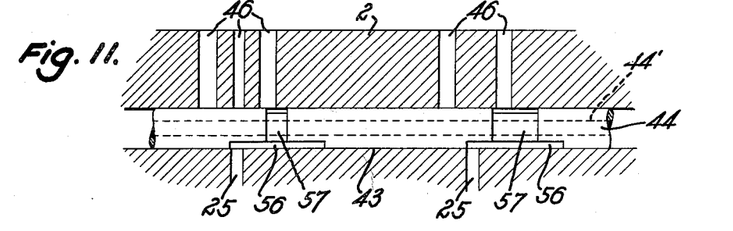
Figs. 11, 12 and 13 are fragmentary sectional views showing modified multiple port arrangements for the form of the device illustrated in Figs. 7, 8 and 9.
Figure 12:
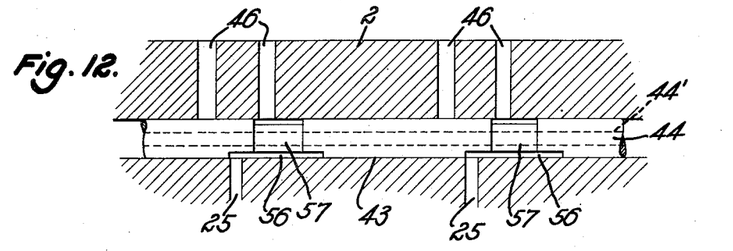
Figure 13:
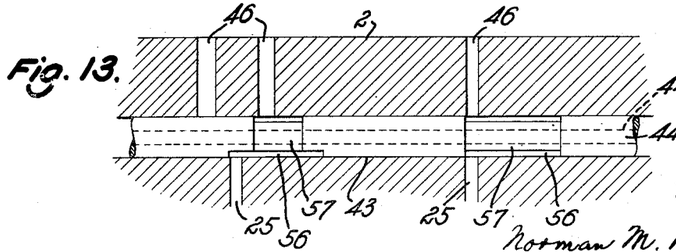

Variations of this nature are illustrated in Figs. 11, 12 and 13, wherein five, four and three ports 46 are shown, respectively, the distributing valve 44 being modified accordingly respecting its recesses 57.

Moreover, it will be seen that the volume of supply to each of the recesses 57 may be the same, say 1 c. c., but delivery to the ports 46 and their connected outlets 49 may be any desired portion of that volume, depending upon the number of such ports 46. For example, as shown in Fig. 11, with each of the two recesses 57 receiving 1 c. c., the three ports 46 at the left will each deliver ⅓ c. c., and the two ports 46 at the right will each deliver ½ c. c. Furthermore, the volume of supply to the recesses 57 may, if desired, be appropriately varied by use of the rods 37, as hereinbefore described. In other words, the volume of supply to each of the recesses 57 may be the same or different, as desired, but the delivery from each will be equally divided between the ports 46 connected therewith.

It is to be noted that the shaft 53 extends from one member of the body to the other, and hence passes through the plane of separation of the two members. It is, of course, necessary, in order to provide for efficient and satisfactory operation of the gearing including this shaft, that the shaft turn freely, and it must therefore have perfect alignment in its bearings, and the pinions carried by it must freely engage the teeth of their cooperating racks. In order to provide this effective functioning, proper assembly of the two members of the body with respect to the shaft and its pinions is ensured by recessing each of the body members axially of the shaft bearings, as indicated at 58 and 59, to receive a disk or washer 60 which, although it lies medially of the plane of separation of the body members, extends in both directions outside of this plane and forms, in effect, a rotative bearing for the body members around the shaft axis.

In the form of this gearing disclosed in Fig. 8 the pinion 54 engaging the rack extension 55 of the plunger is formed integrally with the shaft 53 and has a counter-bored hub 54' to receive a spring 61 which bears against a ball 62 arranged at the end of the counterbore, the opposite end of this spring bearing against the base of a recess 63 formed in an adjacent portion of the body and into which a part of the hub of the pinion extends. The opposite end of the hub bears against the disk or washer 60 in thrust relationship, thus providing a lubricant-tight seal between the hub of the pinion 54 and the lower face of the washer 60 to prevent flow or leakage of lubricant from bore 9, along the shaft 53 to the bore 43 in which latter the distributing valve 44 reciprocates. The other pinion 52 is slipped upon a squared end 64 of the shaft 53 and this assembly of shaft and pinions is held in place in the body by a screw-threaded cap member 65, the diameter of the threaded hole in the body into which this cap member is screwed being sufficient to permit assembly therethrough of the pinion 52 upon the squared end 64 of the shaft. Preferably, the arrangement of the teeth on the pinion 52 with respect to its squared opening through which the squared end 64 of the shaft 53 passes is such that by angular re-adjustment of the pinion upon the squared end of the shaft an appropriate predetermined displacement of the teeth of the pinion will be made to give a desired adjustment of the reciprocative throw imparted thereby to the distributor valve 44.

From the description of the construction and operation of the two feed divider of Figs. 1 to 5 and 10 it will be evident that with the parts of the modified form of Figs. 7 to 9 in the position shown in Fig. 8, pressure lubricant acting against the right-hand end of plunger 11 will move it to the left forcing pressure lubricant previously admitted, out through left-hand port 25, through left-hand port 56, around left-hand port 57 and out through inner port 46 of the left-hand group of three. The plunger 11, being rack and pinion connected with the distributing valve 44, moves the distributing valve in unison with it and during the leftward movement of the plunger and distributing valve outlet 25 is brought into communication with each of the ports 46 in turn, and during a like proportion of the travel; in this case one third of such travel. Thus the lubricant delivered at each outlet 49 is of equal volume. During the leftward movement of the distributing valve and plunger, the recess 57 on the right-hand end has registered in sequence with the ports 46 on that end, but as portion 32 of the valve member 8, acting as a slide valve has closed port 25 on the right-hand end, no delivery is made on that end until the distributing valve has completed its movement to the left and the valve member 8 has reversed to the position shown in Fig. 4. The operation just described is then repeated in reverse and this cycle of operations continued as long as pressure lubricant is supplied at inlet 20, Fig. 3.

It will be obvious that, by placing in engagement with the distributing valve rack a pinion having a greater number of teeth than the pinion engaging the plunger, the stroke of the distributor valve can be made greatly more than that of the plunger, thus permitting any number of final outlets to be supplied by ports 25.

The mode of operation of the modifications shown in Figs. 11, 12 and 13 will be apparent from the foregoing.

Various changes are considered to be within the spirit of the invention and the scope of the following claims.

What I claim is:

1. In a device for feeding lubricants or other fluids from a pressure source to a plurality of delivery points, a body provided with a single inlet for the fluid under pressure and a plurality of outlets, parallel bores in said body, and means for intermittently distributing fluid from said inlet to said outlets selectively, said means including a reciprocable plunger arranged in one of said bores and operative under the influence of pressure fluid introduced at one end of the bore to discharge fluid from the other end of said bore to said outlets whereby said plunger is movable in response to the pressure fluid alternately applied to its ends, a valve member reciprocable in the other bore, oscillatable link means interposed between and having its end adjacent portions connected with said valve member and plunger respectively, and fulcrum means for the link means intermediate the ends thereof, whereby movement of said plunger is communicated to said valve member.

2. In a device for feeding lubricants or other fluids from a pressure source to a plurality of delivery points, a body provided with adjacent bores, a plunger reciprocable in one of said bores and a valve member reciprocable in the other bore, an inlet for pressure fluid in constant communication with the bore of the valve member adjacent to both ends of said valve member, outlets for fluid communicating with the bore of said valve member adjacent to both of its ends, said plunger being reciprocated by pressure fluid alternately applied to its opposite ends, and said valve member being operatively connected with said plunger and reciprocable in response to reciprocation thereof, said body having ports to afford communication between the bore of said valve member and the bore of said plunger at both ends of said bores, said valve member functioning to open and close said ports and said outlets.

3. In a device for feeding lubricants or other fluids from a pressure source to a plurality of delivery points, a body provided with adjacent bores, a plunger reciprocable in one of said bores and a valve member reciprocable in the other bore, an inlet for pressure fluid in constant communication with the bore of the valve member adjacent to both ends of said valve member, outlets for fluid communicating with the bore of said valve member adjacent to both of its ends, said plunger being reciprocated by pressure fluid alternately applied to its opposite ends, and said valve member being operatively connected with said plunger and reciprocable in response to reciprocation thereof, said body having ports to afford communication between the bore of said valve member and the bore of said plunger at both ends of said bores, said valve member functioning to open and close said ports and said outlets, and means for releasably latching said valve member at the limits of its reciprocative stroke.

4. In a device for feeding lubricants or other fluids from a pressure source to a plurality of delivery points, a body provided with adjacent bores, a plunger reciprocable in one of said bores and a valve member reciprocable in the other bore, an inlet for pressure fluid in constant communication with the bore of the valve member adjacent to both ends of said valve member, outlets for fluid communicating with the bore of said valve member adjacent to both of its ends, said plunger being reciprocated by pressure fluid alternately applied to its opposite ends, and said valve member being operatively connected with said plunger and reciprocable in response to reciprocation thereof, said body having ports to afford communication between the bore of said valve member and the bore of said plunger at both ends of said bores, said valve member functioning to open and close said ports and said outlets, and said valve member being ineffective to close said ports and said outlets in the event said valve member assumes a median position, whereby pressure fluid may by-pass from said inlet to said outlets.

5. In a device for feeding lubricants or other fluids from a pressure source to a plurality of delivery points, a body, a positively reciprocated plunger and a reciprocable valve member slidable in said body, link means providing an operating connection between said plunger and valve member and disposed for attachment to said plunger and valve member intermediate their ends, and abutment means in said body providing fulcrums cooperating with said link means, whereby reciprocation of said plunger reciprocates said valve member in opposite sense.

6. In a device for feeding lubricants or other fluids from a pressure source to a plurality of delivery points, a body, a positively reciprocated plunger and a reciprocable valve member slidable in said body, link means including a resilient compression member providing an operating connection between said plunger and valve member, and spaced abutment means in said body providing fulcrums alternately cooperating with said link means, whereby reciprocation of said plunger reciprocates said valve member in opposite sense to an extent approaching the limits of its reciprocative movement, completion of such movement being accomplished by expansion of said resilient compression member.

7. In a device for feeding lubricants or other fluids from a pressure source to a plurality of delivery points, a body, a positively reciprocated plunger and a reciprocable valve member slidable in said body, link means including two telescoping members enclosing a resilient compression member and providing an operating connection between said plunger and valve member, and spaced abutment means in said body providing fulcrums alternately cooperating with said link means, whereby reciprocation of said plunger reciprocates said valve member in opposite sense to an extent approaching the limits of its reciprocative movement, completion of such movement being accomplished by expansion of said resilient compression member serving to lengthen the link means by extension of the telescoping members thereof.

8. In a device for feeding lubricants or other fluids from a pressure source to a plurality of delivery points, a body provided with a single inlet for fluid under pressure and a plurality of outlets, and means for intermittently distributing fluid from said inlet to said outlets selectively in measured quantities, said means including a plunger reciprocable in a bore in said body providing chambers at opposite ends of the plunger, a valve member reciprocable in a bore in said body connected at both of its ends with said inlet and ported adjacent to its ends for communication with said chambers and with said outlets respectively, and link means connecting said valve member with said plunger, said valve member being thus made reciprocable in response to reciprocation of the plunger and thus serving to admit pressure fluid to one chamber and permit discharge of previously admitted fluid from the other chamber to its respective outlet, whereby each of said chambers alternately constitutes a power cylinder and fluid forcing cylinder.

9. In a device for feeding lubricants or other fluids from a pressure source to a plurality of delivery points, a body provided with an inlet for fluid under pressure and a plurality of outlets, and means for intermittently distributing fluid from said inlet to said outlets selectively, said means including a reciprocable plunger movable in response to the pressure fluid alternately applied to its ends, a valve member operating in response to reciprocation of said plunger to control said inlet and to pass fluid to said outlets, and a distributor valve for controlling discharge of fluid from said outlets, said distributor valve being actuated by said plunger.

10. In a device for feeding lubricants or other fluids from a pressure source to a plurality of delivery points, a body provided with an inlet for fluid under pressure and a plurality of outlets, and means for intermittently distributing fluid from said inlet to said outlets selectively, said means including a reciprocable plunger movable in response to the pressure fluid alternately applied to its ends, a valve member operating in response to reciprocation of said plunger to control said inlet and to pass fluid to said outlets, and a distributor valve for controlling discharge of fluid from said outlets, said distributor valve being connected to and reciprocating in consonance with said plunger.

11. In a device for feeding lubricants or other fluids from a pressure source to a plurality of delivery points, a body provided with an inlet for fluid under pressure and a plurality of outlets, and means for intermittently distributing fluid from said inlet to said outlets selectively, said means including a reciprocable plunger movable in response to the pressure fluid alternately applied to its ends, a valve member operating in response to reciprocation of said plunger to control said inlet and to pass fluid to said outlets, a distributor valve slidable relatively to said outlets to control the discharge of fluid therefrom successively, and a rack and gear mechanism connecting said distributor valve with said plunger and serving to impart reciprocative sliding movement from said plunger to said distributor valve.

12. In a device for feeding lubricants or other fluids from a pressure source to a plurality of delivery points, a body comprising two mating members separably assembled, reciprocable fluid feeding means associated with one of said members, fluid distributing means associated with the other member, gearing interconnecting said means and including a shaft extending through the plane of separation of said body members, and a disk interposed in said plane and embracing said shaft and definitely located with respect to said shaft and to both body members, whereby misassembly of said members and misalignment of said shaft therein is prevented.

13. In a device for feeding lubricants or other fluids from a pressure source to a plurality of delivery points, a body comprising two mating members separably assembled, reciprocable fluid feeding means associated with one of said members, fluid distributing means associated with the other member, gearing interconnecting said means and including a shaft extending through the plane of separation of said body members, and a disk interposed in said plane and embracing said shaft and definitely located with respect to said shaft and to both body members, whereby misassembly of said members and misalignment of said shaft therein is prevented, said disk providing also a thrust bearing for a rotative member of said gearing.

14. In a device for feeding lubricants or other fluids from a pressure source to a plurality of delivery points, a body comprising two mating members separably assembled, a reciprocable plunger associated with one of said members, a distributing valve associated with the other member, gearing interconnecting said plunger and valve and including racks on said plunger and valve respectively, a shaft extending through the plane of separation of said body members and carrying at its extremities pinions meshing with said racks, and a disk interposed in said plane and embracing said shaft and definitely located with respect to said shaft and to both body members, whereby misassembly of said members and misalignment of said shaft therein is prevented, said disk serving also as a thrust bearing for one of said pinions.

15. In a device for feeding lubricants or other fluids from a pressure source to a plurality of delivery points, a body comprising two mating members separably assembled, a reciprocable plunger associated with one of said members, a distributing valve associated with the other member, gearing interconnecting said plunger and valve and including racks on said plunger and valve respectively, a shaft extending through the plane of separation of said body members and carrying at its extremities pinions meshing with said racks, a cushioning member bearing against one end of said shaft, and a disk interposed in said plane of separation and embracing said shaft and definitely located with respect to said shaft and to both body members, whereby misassembly of said members and misalignment of said shaft therein is prevented, said disk serving also as a thrust bearing to receive the thrust of said cushioning member and as a fluid seal.

16. In a divider for lubricating systems, a body provided with an inlet for lubricant under pressure and a plurality of outlets, and means for intermittently distributing lubricant from said inlet to said outlets selectively, said means including a reciprocable plunger movable in response to the pressure lubricant alternately applied to its ends, and a valve member operatively connected with said plunger and movable in response to movement thereof, and means comprising a manifold separably applied to said body adjacent to said outlets for supplying a pressure fluid at said outlets, whereby the lubricant delivered thereto may be entrained and thus delivered to points of application.

17. In a divider for lubrication systems, a body provided with an inlet for lubricant under pressure and a plurality of outlets, and means for intermittently distributing lubricant from said inlet to said outlets selectively, said means including a reciprocable plunger movable in response to the pressure lubricant alternately applied to its ends, and a valve member operatively connected with said plunger and movable in response to movement thereof, check valves associated with said outlets, and including guide means threaded into said body, and means comprising a manifold separably attached to said body by said threaded guide means and serving to supply pressure fluid at said outlets, whereby the lubricant delivered thereto may be entrained and thus delivered to points of application.

18. In a device for feeding lubricants or other fluids from a pressure source to a plurality of delivery points, a body provided with adjacent bores, a plunger reciprocable in one of said bores, and a valve member reciprocable in the other bore, an inlet for pressure fluid in constant communication with the bore of the valve member adjacent to both ends of said valve member, outlets for fluid communicating with the bore of said valve member adjacent to both of its ends, said plunger being reciprocated by pressure fluid alternately applied to its opposite ends, said valve member being operatively connected with said plunger and reciprocable in response to reciprocation thereof, said body having ports to afford communication between the bore of said valve member and the bore of said plunger at both ends of said bores, and said valve member provided with heads adjacent to its ends which heads function as plug valves to open and close said ports and as slide valves to open and close said outlets.

NORMAN M. BARKER.

CERTIFICATE OF CORRECTION.

Patent No. 2,232,307. February 18, 1941.

NORMAN M. BARKER.

It is hereby certified that error appears in the printed specification of the above numbered patent requiring correction as follows: Page 1, first column, line 34, for "quanity" read --quantity--; page 7, first column, line 27, claim 16, for the word "lubricating" read --lubrication--; line 32, same claim, strike out the words and syllable "inlet to said outlets selectively, said means in-" and insert the same after the word "said" in line 30, same claim 16; and that the said Letters Patent should be read with this correction therein that the same may conform to the record of the case in the Patent Office.

Signed and sealed this 18th day of March, A. D. 1941.

Henry Van Arsdale,
Acting Commissioner of Patents.